A. J. ROWLEDGE.
MECHANISM FOR THE OPERATION AND CONTROL OF VARIABLE SPEED GEARS.
APPLICATION FILED APR. 27, 1917.

1,240,374.

Patented Sept. 18, 1917.
4 SHEETS—SHEET 1.

A. J. ROWLEDGE.
MECHANISM FOR THE OPERATION AND CONTROL OF VARIABLE SPEED GEARS.
APPLICATION FILED APR. 27, 1917.

1,240,374.

Patented Sept. 18, 1917.
4 SHEETS—SHEET 2.

FIG.5.

UNITED STATES PATENT OFFICE.

ARTHUR JOHN ROWLEDGE, OF LONDON, ENGLAND, ASSIGNOR TO D. NAPIER & SON LIMITED, OF LONDON, ENGLAND.

MECHANISM FOR THE OPERATION AND CONTROL OF VARIABLE-SPEED GEARS.

1,240,374.  Specification of Letters Patent.  Patented Sept. 18, 1917.

Application filed April 27, 1917. Serial No. 165,012.

*To all whom it may concern:*

Be it known that I, ARTHUR JOHN ROWLEDGE, a subject of the King of England, and residing at London, in England, have invented certain new and useful Improvements in Mechanism for the Operation and Control of Variable-Speed Gears, of which the following is a specification.

This invention relates to mechanism for the operation and control of variable speed gears of the epicyclic type in which the speed variations are effected by the action of clutches and brakes on different gear members and has for its object to enable the changes of speed to be brought about mechanically and partly automatically with or without the employment of electric power.

In control mechanism of this type particularly when applied to the variable speed gears of motor road vehicles simplicity and ease of operation are desirable and in fact, essential. In the first place it must be possible to effect the selection without undue expenditure of power on the part of the operator. This is especially the case where the vehicle is of a type which necessitates the use of strong springs for the operation of the clutches and brakes. Secondly the process of selection must be an easy one, that is to say, any hand motions that have to be performed must be simple and such as necessitate a minimum of power. Other mechanism which has to be operated during the process of selection must also be simple and easily actuated. Thirdly if electric power is used it is necessary that the amount of current employed be as small as possible and that the demands on the source of current be only intermittent and for short periods. In the control mechanism which forms the subject of the present invention all these desired ends are attained.

In the epicyclic variable speed gear to which the present invention is applied the clutches and brakes are all constructed and arranged so that there is a constant tendency, which is brought about by spring action, for each clutch to engage and each brake to be applied. The members by means of which the clutches and brakes are respectively controlled or actuated are thus also separately moved by spring action into their operative positions. According to this invention the selection of those clutches and brakes by means of which a desired gear is engaged is effected by a rotatable plate the periphery of which is shaped to engage the ends of the spring-controlled clutch-and-brake-actuating members which are grouped around it. When by the movement of a separate member the normal pressure which the clutch and brake members exert on the selector plate is temporarily relieved, that is to say, when by the movement of this separate member, the clutch and brake members are all simultaneously moved temporarily out of engagement with the selector plate the latter is left free to be rotated into a new position when it will determine the positions of the clutch and brake members in accordance with the gear that is to be engaged. The separate relieving member is moved into its operative position by a pedal or an electric motor and when power ceases to be thus applied to this member it returns automatically to its inoperative position preferably by the action on it of the springs controlling the clutch-and-brake-actuating members. It is thus possible to arrange that the force of the springs controlling the clutches and brakes can be opposed temporarily in the most advantageous manner from the point of view of expenditure of power while by means of this member the selector is so relieved of the forces normally acting on it that it can be rotated and set with ease by a hand-operated lever and connections of light construction. By grouping the clutch-and-brake-actuating members about the selector and forming the latter as a disk or the like while the relieving member is constituted by a rotatable cam a compact and simple construction results.

The form of the selector may vary but preferably it is constructed as a disk or the like with indentations or recesses in its periphery, these indentations being severally adapted to engage the ends of the clutch-and-brake-actuating members either in their operative or inoperative positions. The indentations are arranged so that according to the position into which the selector is rotated so will those clutch and brake members be permitted to assume their operative positions which by their combined actions on the gear members produce the desired speed. The disk is conveniently so engaged by the clutch and brake members that the selector is locked in its set position by the members as they lie in the recesses or indentations. Thus it is not possible to move the selector until the clutch and brake members are all simultaneously moved out of engagement with the selector and the pressure which they exert or tend to exert on the disk is relieved. The selector is preferably so formed that each lesser indentation of its periphery when engaged by a clutch or brake member holds that member in such a position that the clutch or brake controlled thereby is inoperative. The greater indentations are such that the corresponding clutch and brake members can move toward the center of the disk to an extent necessary to allow the clutches and brakes controlled by these members to come into operation as a result of the springs acting on these clutches and brakes.

The relieving member preferably takes the form of a cam mounted coaxially with the selector and so placed beside it that when this cam is rotated to the required extent it will simultaneously make contact with the ends of all the clutch-and-brake-actuating members grouped about it and move these into their inoperative positions. The ends of these clutch and brake members are then all held clear of the periphery of the selector. The cam is suitably shaped in accordance with the disposition of the clutch and brake members about it and it is preferably provided with such inclined surfaces that when the power by which it is rotated into its operative position ceases to act and the cam is left free the pressure which the clutch and brake members exert upon the cam by reason of the springs acting on these members will cause the cam to rotate in the opposite direction until it assumes its inoperative position. The clutch and brake members then again come in contact with the selector disk. Alternatively the return of the relieving member to its inoperative position may be brought about by separate spring action or by reversing the action of the motor if one is employed to impart the necessary operative movement to the member.

In the accompanying drawings.

Like letters indicate like parts throughout the drawings.

Figure 1:
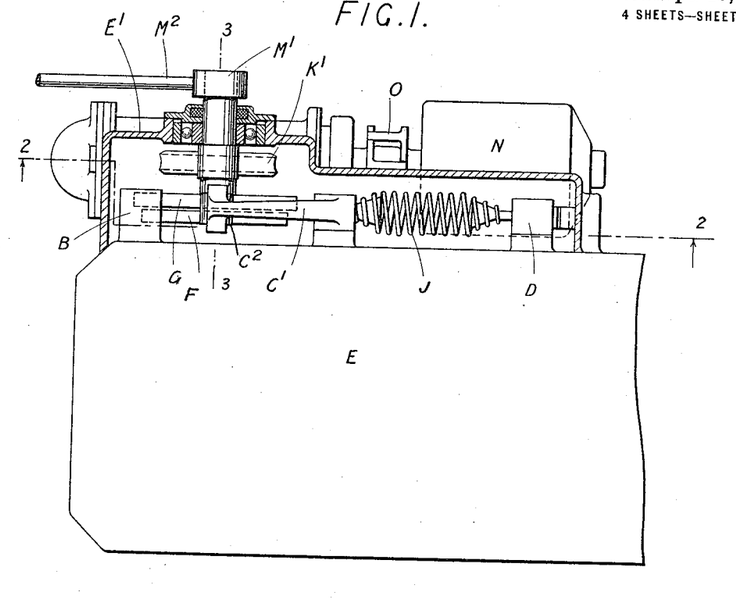
Figure 1 is a part sectional plan of one construction of the improved gear control mechanism.
Figure 2:
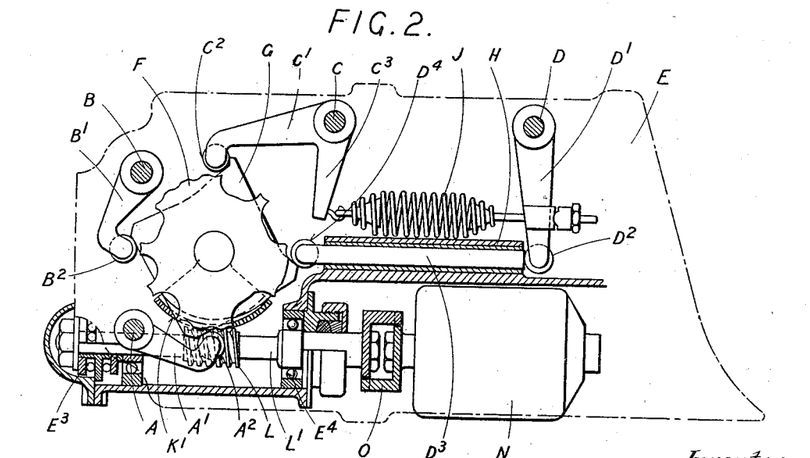
Fig. 2 is a section on the line 2—2 of Fig. 1 looking in the direction of the arrows on that figure.

Referring to Figs. 1 and 2 the gear which is of the epicyclic type and of known construction is disposed within a suitable casing and is assumed by way of example to be arranged to provide three forward speeds and a reverse. These speed variations are brought about by means of two clutches and two brakes. The clutches are respectively operated through rock-shafts A and B and the brakes are respectively operated through rock-shafts C and D, which pass through the side wall of the gear casing E. These rock-shafts may all be positioned as in the construction illustrated so that they lie adjacent to the clutches and brakes within the casing E which they respectively control. Alternatively for convenience in operating them by the mechanism which lies outside the gear casing one or more of these rock-shafts may be otherwise disposed in which case the end of such rock-shaft which lies within the casing is connected by means of levers and links to a second rock-shaft which acts directly on the brake or clutch. The manner in which these rock-shafts actuate the clutches and brakes is immaterial to the present invention and various known arrangements may be employed for the purpose.

On the outer end of each rock-shaft A, B, C and D is mounted a lever arm $A'$, $B'$, $C'$ and $D'$ on the end of each of which is a roller $A^2$, $B^2$, $C^2$ and $D^2$. All the levers are so disposed that the end of each can move substantially radially about an axis on which are mounted a disk like selector F and a relieving cam G. Owing to the position of the rock-shaft D and the lever $D'$ in the construction illustrated the end of this lever cannot conveniently be arranged to lie sufficiently close to the peripheries of the selector F and cam G for these to act directly on the end of the lever $D'$. Hence there is interposed a sliding rod $D^3$ against one end of which bears the roller $D^2$ while on the other end of the rod is a roller $D^4$ which is in such a position that it can be acted on by the selector and cam. The rod $D^3$ slides in a suitable guide H. The rock-shafts A and B and the clutches respectively controlled by them are spring actuated the springs tending to cause the clutches to engage and the levers $A'$ and $B'$ to move so that their ends approach the peripheries of the selector F and cam G. The two brakes are also arranged so as to be applied by spring action which also causes the ends of the levers $C'$ and $D'$ to move toward the peripheries of the selector and cam. In the construction shown a single spring J is employed to actuate both brakes one end of this spring being attached to the lever D' while the other end is connected to a second lever C³ mounted on the rock-shaft C or formed integral with the lever C' as a bell-crank lever.

Figure 3:
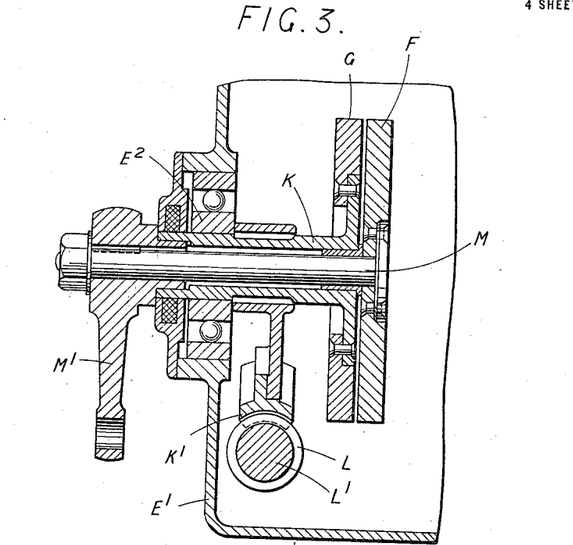
Fig. 3 is a section on the line 3—3 of Fig. 1, certain parts being omitted, the section being intended to illustrate the manner in which the selector and relieving cam are mounted and arranged.

The selector F and cam G are rotatably mounted coaxially as shown in Fig. 3 within a casing E' which lies at one side of the gear casing E. The cam G is fixed on one end of a hollow shaft K whose other end is carried in bearings E² in the side wall of the casing E'. On the shaft K between the cam and the wall of the casing is keyed a quadrant K' whose periphery is formed as a part of a worm wheel which engages a worm L mounted on a rotatable shaft L' carried in bearings E³ E⁴ in the casing E' as shown in Fig. 2. The selector F is fixed on one side of a spindle M which lies within and passes right through the hollow shaft K so as to be separately rotatable. On the outer end of the spindle M is mounted a lever M' to which is connected a rod or link M². By means of this rod the lever M' can be moved and the selector F rotated and set in some convenient operating point at a distance where a control lever of suitable type is arranged.

Figure 4:
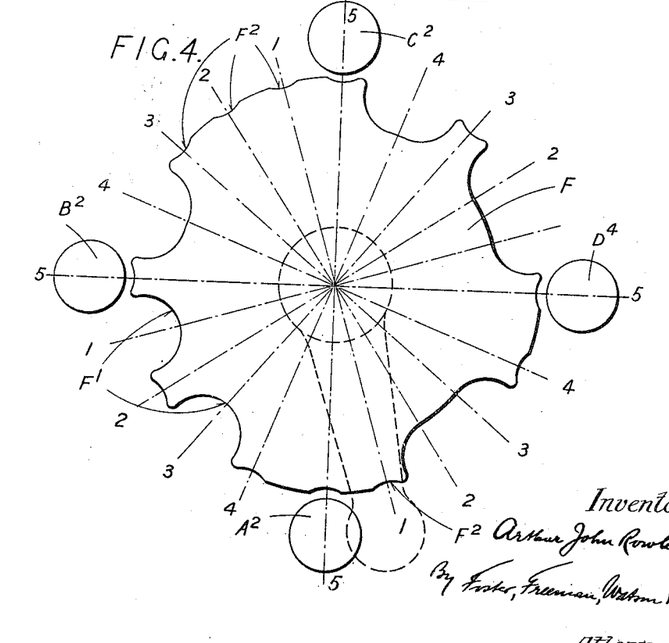
Fig. 4 is an elevation of the selector.

The detail construction of the selector F is shown in Fig. 4. This is of a disk-like nature having formed in its periphery several notches or recesses F' of substantial depth and several lesser indentations F². Each notch F' is of such dimensions that a roller A², B², C² or D⁴ can drop into it and such movement will then be permitted to the lever A', B', C', or D' that the corresponding rock-shaft will rotate sufficiently to allow a clutch to be engaged or a brake to be applied. When a roller engages one of the lesser indentations F² operative movement of the corresponding lever is not possible but the lever is held in such a position that the clutch or brake controlled by it will be disengaged or held off. The number and relative positions of the notches F' and the indentations F² are such that when the selector has been rotated and set in any determined position the levers A', B', C' and D' will be permitted to move or will be held inoperative in the combination necessary to produce in the gear the desired speed or maintain it in a neutral state. The extent to which the selector can be rotated for setting purposes is 90° and the several positions which it can occupy are indicated in Fig. 4 by numbered radial lines. The line No. 1 indicates the position for the first speed, the line No. 2 the position for the second speed, the line No. 3 the position for the third speed, and the line No. 4 the position for obtaining the reverse. The line No. 5 indicates the neutral position in which the selector is shown as set in the figure. In this position it will be seen that all the four rollers A², B², C² and D⁴ will engage lesser indentations and the levers carrying these rollers will be held in their inoperative positions so that no clutch will be engaged or brake applied. If the selector is rotated clockwise as viewed in Fig. 4 into the position No. 1 for the first speed the levers A' and C' will be held inoperative but the levers B' and D' will be allowed to move owing to the rollers B² and D⁴ dropping into the notches which will then be presented to them. The clutch and brake respectively controlled by these levers will be engaged and applied. Similarly if the selector is moved successively into the other positions indicated the permitted movements of the different levers will be apparent.

Figure 5:
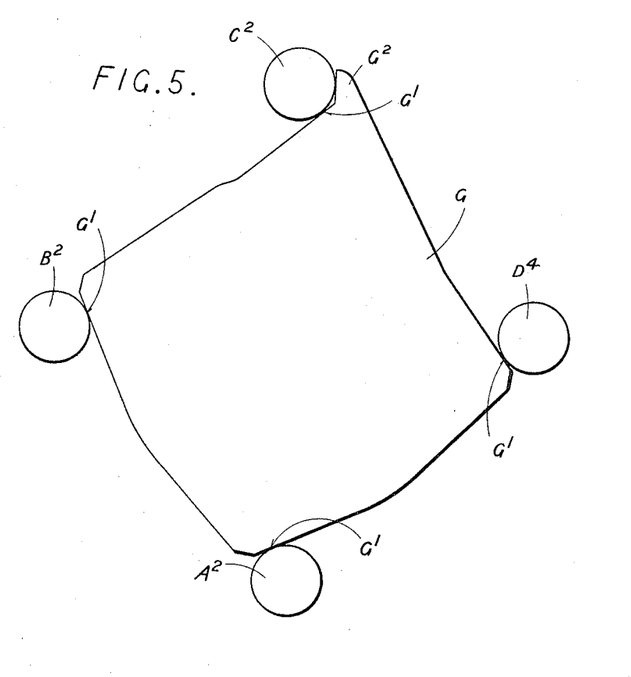
Fig. 5 is an elevation of the relieving cam.

It will be seen that when the selector F is set in one of its gear positions and at least one of the rollers lies in a notch F' it is not possible to rotate the selector further unless the pressure of the rollers on the periphery of the selector is relieved and those rollers which may lie in notches are lifted out of those notches. This is effected by the action of the cam G the detail construction of which is shown in Fig. 5. Each roller A², B², C² and D⁴ is of such width that it can be acted on by the cam G as well as by the selector F. The cam is provided with four projecting portions G' which are so formed and arranged in relation to the positions of the rollers about the cam that if the cam is rotated in one direction these raised portions will act simultaneously on the several rollers and lift them clear of the periphery of the selector which is thus left free to be rotated and set in a fresh position. The cam may be positively rotated in the reverse direction so as to bring it into its inoperative position or the mechanism may be so arranged that when the power by means of which operative movement is imparted to the cam is relaxed the spring pressure of the clutch and brake operating levers acting through the rollers on the inclines of the cam will cause the latter to turn in the reverse direction into its inoperative position. The cam G may be variously shaped the form shown in Fig. 5 being set forth by way of example. The cam may be formed so that as it is rotated it will act on or pick up and move all the clutch and brake operating levers simultaneously or it may be so formed that it will act on these levers in succession. Thus for example the lever A' may first be raised wholly or partially into its inoperative position then as the cam rotates further it will pick up and similarly raise the lever B' and afterward the lever C' and finally the lever D'. By thus forming the cam to act successively on the levers it is possible to employ a less powerful electric motor for the purpose of rotating the cam since the cam has then to act against the power of the springs controlling the clutch and brake operating levers in succession instead of simultaneously. The cam may be variously formed to act thus or in a like manner on the levers. In some cases in place of the cam acting on all the levers in succession it may act simultaneously for example on two of them and subsequently simultaneously on the other two levers according to the number of the levers and the disposition of the controlling springs.

The power necessary to rotate the cam G may be derived from various sources but preferably an electric motor is employed to rotate the shaft L' which carries the worm L. One such arrangement is illustrated in Fig. 1 where a motor N is disposed coaxially with the shaft L' the adjacent ends of the motor and worm shafts being connected by a clutch O of the dog or other mechanical type. When the current is switched on to the motor N the shaft L' and worm L will be rotated in the direction and to the extent necessary to move the cam G into its operative position when it will relieve the pressure of the rollers on the selector which can then be rotated and set. When the current is cut off from the motor or reversed, if the motor is of the reversible type, the cam will turn into its inoperative position either by the above described action of the clutch and brake levers thereon or by the positive action of the motor.

The cam G may be provided with one or more projections such as $G^2$, Fig. 5, in order to limit the extent to which the cam can be rotated. In the example shown this results from the projection $G^2$ coming in contact with the roller $C^2$.

Figure 6:
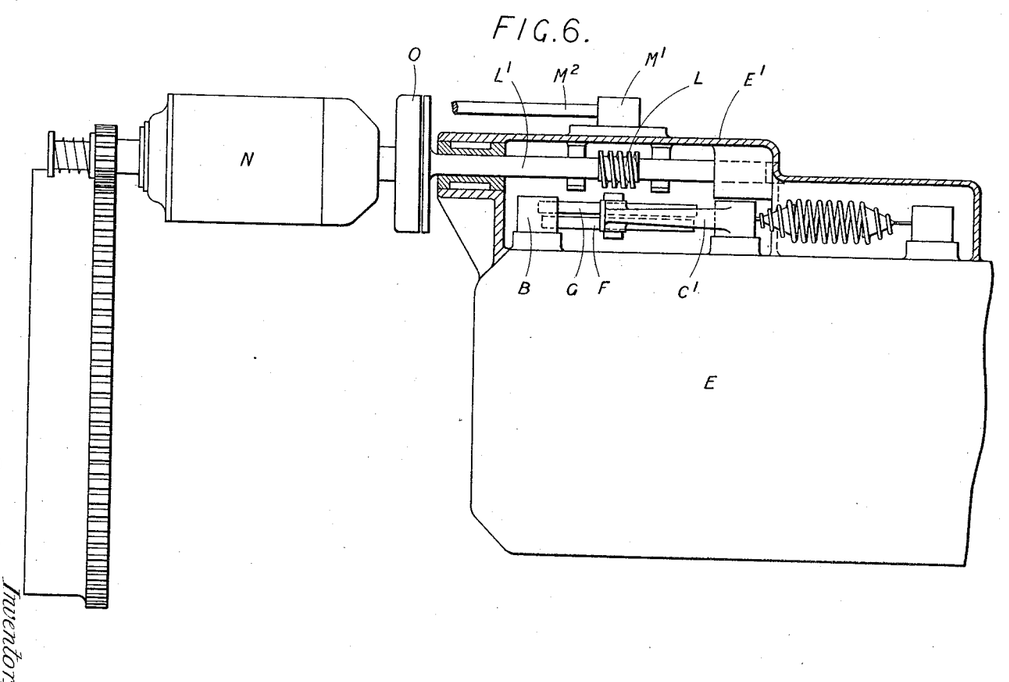
Fig. 6 is a part sectional plan showing a modified arrangement of the control mechanism.

In Fig. 6 is shown an alternative arrangement the motor N in this case being that employed for starting an internal combustion engine which drives through the gear whose speed variations are controlled by the present invention. Here the clutch O through which the motor N drives the worm shaft L' is of the electromagnetic type and is engaged at the time when the motor is required to rotate the cam G so that the selector F may be set for obtaining a speed or to throw the gear into neutral. The motor N having served to start the engine is then available for gear changing purposes. The switch controlling the current to the motor when used for changing the gear may be combined with the switch which controls the current to the clutch so that the clutch will be engaged when the motor is required to rotate the shaft L'. Other arrangements of electric motor may be employed for operating the cam G in the manner described.

The details of construction may be varied to meet requirements and in accordance with the structure of the gear with which it is to be used. Though more particularly described above as applied to a three speed gear it is obvious that the invention may equally well be used with a gear providing a greater or less number of speeds.

What I claim as my invention and desire to secure by Letters Patent is:—

1. In a variable speed gear of the epicyclic type in which the speed variations are effected by the action of clutches and brakes on different gear members, the combination of a plurality of clutch and brake actuating members, a rotatable selector member about which the clutch and brake actuating members are disposed so that these members can be acted on and controlled by the selector member which is so formed that according to the position in which it is set by rotation it will alternatively permit or prevent operative movement of the several clutch and brake actuating members, means for rotating the selector member, and means for moving each of the clutch and brake actuating members into and retaining them temporarily in positions such that they are not controlled by the selector which is then left free to be set by rotation as set forth.

2. In a variable speed gear of the epicyclic type in which the speed variations are effected by the action of clutches and brakes on different gear members, the combination of a plurality of clutch and brake actuating members, a rotatable selector member about which the clutch and brake actuating members are disposed so that these members can be acted on and controlled by the selector member which is so formed that according to the position in which it is set by rotation it will alternatively permit or prevent operative movement of the several clutch and brake actuating members, means for rotating the selector member, a rotatable cam member mounted concentric with but separate from the selector member the cam member being so formed that rotation thereof will cause it to act on each of the clutch and brake actuating members and move them into and retain them temporarily in positions such that they are not controlled by the selector which is then left free to be set by rotation, and means for rotating the cam member as set forth.

3. In a variable speed gear of the epicyclic type in which the speed variations are effected by the action of clutches and brakes on different gear members, the combination of a plurality of clutch and brake actuating members, springs tending to move these members into their operative positions so as to effect engagement of the clutches and application of the brakes, a rotatable selector member about which the clutch and brake actuating members are disposed so that these members can be acted on and controlled by the selector member which is so formed that according to the position in which it is set by rotation it will alternatively permit or prevent operative movement of the several clutch and brake actuating members, means for rotating the selector member, and means for moving each of the clutch and brake actuating members into and retaining them temporarily in positions such that they are not controlled by the selector which is then left free to be set by rotation as set forth.

4. In a variable speed gear of the epicyclic type in which the speed variations are effected by the action of clutches and brakes on different gear members, the combination of a plurality of clutch and brake actuating members, springs tending to move these members into their operative positions so as to effect engagement of the clutches and application of the brake, a rotatable selector member about which the clutch and brake actuating members are disposed so that these members can be acted on and controlled by the selector member which is so formed that according to the position in which it is set by rotation it will alternatively permit or prevent operative movement of the several clutch and brake actuating members, means for rotating the selector member, a rotatable cam member mounted concentric with but separate from the selector member the cam member being so formed that rotation thereof will cause it to act on each of the clutch and brake actuating members and move them into and retain them temporarily in positions such that they are not controlled by the selector which it then left free to be set by rotation, and means for rotating the cam member, as set forth.

5. In a variable speed gear of the epicyclic type in which the speed variations are effected by the action of clutches and brakes on different gear members, the combination of a plurality of clutch and brake actuating members, a disk-like rotatable selector member the periphery of which is shaped to alternatively permit or prevent operative movement of and so control each of the clutch and brake actuating members disposed about it according to the position in which the selector member is set by rotation, means for rotating the selector member, and means for moving each of the clutch and brake actuating members into and retaining them temporarily in positions such that they are not controlled by the selector which is then left free to be set by rotation as set forth.

6. In a variable speed gear of the epicyclic type in which the speed variations are effected by the action of clutches and brakes on different gear members, the combination of a plurality of clutch and brake actuating members each comprising a rock-shaft with a lever thereon, a rotatable selector member about which the levers of the clutch and brake actuating members are disposed so that these levers can be acted on and controlled by the selector member which is so formed that according to the position in which it is set by rotation it will alternatively permit or prevent operative movement of the levers and of the clutch and brake actuating members, means for rotating the selector member, and means for moving each of the levers of the clutch and brake actuating members into and retaining them temporarily in positions such that they are not controlled by the selector which is then left free to be set by rotation as set forth.

7. In a variable speed gear of the epicyclic type in which the speed variations are effected by the action of clutches and brakes on different gear members, the combination of a plurality of clutch and brake actuating members, a disk-like rotatable selector member the periphery of which is shaped to alternatively permit or prevent operative movement of and so control each of the clutch and brake actuating members disposed about it according to the position in which the selector member is set by rotation, means for rotating the selector member, a rotatable cam member mounted concentric with but separate from the selector member the cam member being so formed that rotation thereof will cause it to act on each of the clutch and brake actuating members and move them into and retain them temporarily in positions such that they are not controlled by the selector which is then left free to be set by rotation, and means for rotating the cam member as set forth.

8. In a variable speed gear of the epicyclic type in which the speed variations are effected by the action of clutches and brakes on different gear members, the combination of a plurality of clutch and brake actuating members each comprising a rock shaft and a lever thereon, a rotatable selector member about which the levers of the clutch and brake actuating members are disposed so that these levers can be acted on and controlled by the selector member which is so formed that according to the position in which it is set by rotation it will alternatively permit or prevent operative movement of the levers and of the clutch and brake actuating members, means for rotating the selector member, a rotatable cam member mounted concentric with but separate from the selector member the cam member being so formed that rotation thereof will cause it to act on each of the levers of the clutch and brake actuating members and move them into and retain them temporarily in positions such that they are not controlled by the selector which is then left free to be set by rotation, and means for rotating the cam member as set forth.

9. In a variable speed gear of the epicyclic type in which the speed variations are effected by the action of clutches and brakes on different gear members, the combination of a plurality of clutch and brake actuating members, springs tending to move these members into their operative positions so as to effect engagement of the clutches and application of the brakes, a disk-like rotatable selector member the periphery of which is shaped to alternatively permit or prevent operative movement of and so control each of the clutch and brake actuating members disposed about it according to the position in which the selector member is set by rotation, means for rotating the selector member, and means for moving each of the clutch and brake actuating members into and retaining them temporarily in positions such that they are not controlled by the selector which is then left free to be set by rotation as set forth.

10. In a variable speed gear of the epicyclic type in which the speed variations are effected by the action of clutches and brakes on different gear members, the combination of a plurality of clutch and brake actuating members each comprising a rock-shaft with a lever thereon, springs tending to move these members into their operative positions so as to effect engagement of the clutches and application of the brakes, a rotatable selector member about which the levers of the clutch and brake actuating members are disposed so that these levers can be acted on and controlled by the selector member which is so formed that according to the position in which it is set by rotation it will alternatively permit or prevent operative movement of the levers and of the clutch and brake actuating members, means for rotating the selector member, and means for moving each of the levers of the clutch and brake actuating members into and retaining them temporarily in positions such that they are not controlled by the selector which is then left free to be set by rotation as set forth.

11. In a variable speed gear of the epicyclic type in which the speed variations are effected by the action of clutches and brakes on different gear members, the combination of a plurality of clutch and brake actuating members, springs tending to move these members into their operative positions so as to effect engagement of the clutches and application of the brakes, a disk-like rotatable selector member the periphery of which is shaped to alternatively permit or prevent operative movement of and to control each of the clutch and brake actuating members disposed about it according to the position in which the selector member is set by rotation, means for rotating the selector member, a rotatable cam member mounted concentric with but separate from the selector member the cam member being so formed that rotation thereof will cause it to act on each of the clutch and brake actuating members and move them into and retain them temporarily in positions such that they are not controlled by the selector which is then left free to be set by rotation, and means for rotating the cam member as set forth.

12. In a variable speed gear of the epicyclic type in which the speed variations are effected by the action of clutches and brakes on different gear members, the combination of a plurality of clutch and brake actuating members each comprising a rock-shaft with a lever thereon, springs tending to move these members into their operative positions so as to effect engagement of the clutches and application of the brakes, a rotatable selector member about which the levers of the clutch and brake actuating members are disposed so that these levers can be acted on and controlled by the selector member which is so formed that according to the position in which it is set by rotation it will alternatively permit or prevent operative movement of the levers of the clutch and brake actuating members, means for rotating the selector member, a rotatable cam member mounted concentric with but separate from the selector member the cam member being so formed that rotation thereof will cause it to act on each of the clutch and brake actuating members and move them into and retain them temporarily in positions such that they are not controlled by the selector which is then left free to be set by rotation, and means for rotating the cam member as set forth.

13. In a variable speed gear of the epicyclic type in which the speed variations are effected by the action of clutches and brakes on different gear members, the combination of a plurality of clutch and brake actuating members each comprising a rock shaft with a lever thereon, a disk-like rotatable selector member about which the levers of the clutch and brake actuating members are disposed so that these levers can be acted on and controlled by the selector member the periphery of which is shaped to alternatively permit or prevent operative movement of each of the levers of the clutch and brake actuating members according to the position in which the selector member is set by rotation, means for rotating the selector member, and means for moving each of the levers of the clutch and brake actuating members into and retaining them temporarily in positions such that they are not controlled by the selector which is then left free to be set by rotation as set forth.

14. In a variable speed gear of the epicyclic type in which the speed variations are effected by the action of clutches and brakes on different gear members, the combination of a plurality of clutch and brake actuating members each comprising a rock shaft with a lever thereon, springs tending to move these members into their operative positions so as to effect engagement of the clutches and application of the brakes, a disk-like rotatable selector member about which the levers of the clutch and brake actuating members are disposed so that these levers can be acted on and controlled by the selector member the periphery of which is shaped to alternatively permit or prevent operative movement of each of the levers of the clutch and brake actuating members according to the position in which the selector member is set by rotation, means for rotating the selector member, a rotatable cam member mounted concentric with but separate from the selector member the cam member being so formed that rotation thereof will cause it to act on each of the levers of the clutch and brake actuating members and move these members into and retain them temporarily in positions such that they are not controlled by the selector which is then left free to be set by rotation, and means for rotating the cam member as set forth.

15. In a variable speed gear of the epicyclic type in which the speed variations are effected by the action of clutches and brakes on different gear members, the combination of a plurality of clutch and brake actuating members, a rotatable selector member about which the clutch and brake actuating members are disposed so that these members can be acted on and controlled by the selector member which is formed as a disk with recesses in its periphery the depth and relative positions of these recesses being such that according to the position in which the selector is set by rotation the recesses will determine the operative movements which may be permitted by the selector to the selected clutch and brake actuating members in the combinations necessary to effect the speed variations, means for rotating the selector member, and means for moving each of the clutch and brake actuating members into and retaining them temporarily in positions such that they are not controlled by the selector which is then left free to be set by rotation as set forth.

16. In a variable speed gear of the epicyclic type in which the speed variations are effected by the action of clutches and brakes on different gear members, the combination of a plurality of clutch and brake actuating members, a rotatable selector member about which the clutch and brake actuating members are disposed so that these members can be acted on and controlled by the selector member which is so formed that according to the position in which it is set by rotation it will alternatively permit or prevent operative movement of the several clutch and brake actuating members, means for rotating the selector member, a rotatable cam member mounted concentric with but separate from the selector member the cam member being so formed that rotation thereof will cause it to act on each of the clutch and brake actuating members and move them into and retain them temporarily in positions such that they are not controlled by the selector which is then left free to be set by rotation, and an electric motor by means of which the cam member can be rotated into its operative position whence it will automatically return into its inoperative position by rotation in the reverse direction when the current is cut off from the motor as set forth.

17. In a variable speed gear of the epicyclic type in which the speed variations are effected by the action of clutches and brakes on different gear members, the combination of a plurality of clutch and brake actuating members, a rotatable selector member about which the clutch and brake actuating members are disposed so that these members can be acted on and controlled by the selector member which is so formed that according to the position in which it is set by rotation it will alternatively permit or prevent operative movement of the several clutch and brake actuating members, means for rotating the selector member, a rotatable cam member mounted concentric with but separate from the selector member the cam member being so formed that rotation thereof in one direction will cause it to act simultaneously on each of the clutch and brake actuating members and move them all into and retain them temporarily in positions such that they are not controlled by the selector which is then left free to be set by rotation, and means for rotating the cam member as set forth.

18. In a variable speed gear of the epicyclic type in which the speed variations are effected by the action of clutches and brakes on different gear members, the combination of a plurality of clutch and brake actuating members, a rotatable selector member so formed that according to the position in which it is set by rotation it will alternatively permit or prevent operative movement of the several clutch and brake actuating members, means for rotating the selector member, a rotatable cam mounted at the side of the selector member and concentric therewith but separate therefrom the cam being so formed that rotation thereof will cause it to act on all the clutch and brake actuating members, means for rotating the cam and a plurality of controlling levers each forming a part of a clutch or brake actuating member all the levers being so disposed about the selector and the cam that movement of each lever can be controlled by the selector and each lever can be acted on by the cam so as to free the selector in order that it may be set by rotation as set forth.

19. In a variable speed gear of the epicyclic type in which the speed variations are effected by the action of clutches and brakes on different gear members, the combination of a plurality of clutch and brake actuating members, springs tending to move these members into their operative positions so as to effect engagement of the clutches and application of the brakes, a rotatable selector member about which the clutch and brake actuating members are disposed so that these members can be acted on and controlled by the selector member which is formed as a disk with recesses in its periphery the depth and relative positions of these recesses being such that according to the position in which the selector is set by rotation the recesses will determine the operative movements that may be permitted by the selector to the selected clutch and brake actuating members in the combinations necessary to effect the speed variations, means for rotating the selector member, a rotatable cam member mounted concentric with but separate from the selector member the cam member being so formed that rotation thereof will cause it to act on each of the clutch and brake actuating members and move them into and retain them temporarily in positions such that they are not controlled by the selector which is then left free to be set by rotation, and means for rotating the cam member as set forth.

20. In a variable speed gear of the epicyclic type in which the speed variations are effected by the action of clutches and brakes on different gear members, the combination of a plurality of clutch and brake actuating members each comprising a rock shaft with a lever thereon, a rotatable selector member about which the levers of the clutch and brake actuating members are disposed so that these levers can be acted on and the clutch and brake actuating members controlled by the selector member which is formed as a disk with recesses in its periphery the depth and relative positions of these recesses being such that according to the position in which the selector is set by rotation the recesses will determine the operative movements which may be permitted by the selector to the levers of the selected clutch and brake actuating members in the combinations necessary to effect the speed variations, means for rotating the selector member, and means for moving each of the levers of the clutch and brake actuating members into and retaining them temporarily in positions such that they are not controlled by the selector which is then left free to be set by rotation as set forth.

21. In a variable speed gear of the epicyclic type in which the speed variations are effected by the action of clutches and brakes on different gear members, the combination of a plurality of clutch and brake actuating members each comprising a rock shaft with a lever thereon, springs tending to move these members into their operative positions so as to effect engagement of the clutches and application of the brakes, a rotatable selector member about which the levers of the clutch and brake actuating members are disposed so that these levers can be acted on and the clutch and brake actuating members controlled by the selector member which is formed as a disk with recesses in its periphery the depth and relative positions of these recesses being such that according to the position in which the selector is set by rotation the recesses will determine the operative movements which may be permitted by the selector to the levers of the selected clutch and brake actuating members in the combinations necessary to effect the speed variations, means for rotating the selector member, a rotatable cam member mounted concentric with but separate from the selector member the cam member being so formed that rotation thereof will cause it to act on each of the levers of the clutch and brake actuating members and move these members into and retain them temporarily in positions such that they are not controlled by the selector which is then left free to be set by rotation, and means for rotating the cam member as set forth.

22. In a variable speed gear of the epicyclic type in which the speed variations are effected by the action of clutches and brakes on different gear members, the combination of a plurality of clutch and brake actuating members each comprising a rock shaft with a lever thereon, a rotatable selector member about which the levers of the clutch and brake actuating members are disposed so that these levers can be acted on and the clutch and brake actuating members controlled by the selector member which is so formed that according to the position in which it is set by rotation it will alternatively permit or prevent operative movement of each of the levers of the clutch and brake actuating members, means for rotating the selector member, a rotatable cam member concentric with but separate from the selector member the cam member being so formed that rotation thereof in one direction will cause it to act simultaneously on each of the clutch and brake actuating members and move them into and retain them temporarily in position such that they are not controlled by the selector which is then left free to be set by rotation, and means for rotating the cam member as set forth.

23. In a variable speed gear of the epicyclic type in which the speed variations are effected by the action of clutches and brakes on different gear members, the combination of a plurality of clutch and brake actuating members each comprising a rock shaft with a lever thereon, springs tending to move these members into their operative positions so as to effect engagement of the clutches and application of the brakes, a rotatable selector member about which the levers of the clutch and brake actuating members are disposed so that these levers can be acted on and the clutch and brake actuating members controlled by the selector which is so formed that according to the position in which it is set by rotation it will alternatively permit or prevent operative movement of the several clutch and brake actuating members, means for rotating the selector member, a rotatable cam member mounted concentric with but separate from the selector member the cam member being so formed that rotation thereof in one direction will cause it to act simultaneously on each of the levers of the clutch and brake actuating members and move all these members into and retain them temporarily in positions such that they are not controlled by the selector which is then left free to be set by rotation, and means for rotating the cam member as set forth.

24. In a variable speed gear of the epicyclic type in which the speed variations are effected by the action of clutches and brakes on different gear members, the combination of a plurality of clutch and brake actuating members, a rotatable selector member about which the clutch and brake actuating members are disposed so that these members can be acted on and controlled by the selector member which is formed as a disk with recesses in its periphery the depth and relative positions of these recesses being such that according to the position in which the selector is set by rotation the recesses will determine the operative movement which may be permitted by the selector to the selected clutch and brake actuating members in the combinations necessary to effect the speed variations, means for rotating the selector member, a rotatable cam member mounted concentric with but separate from the selector member the cam member being so formed that rotation thereof in one direction will cause it to act simultaneously on each of the clutch and brake actuating members and move them all into and retain them temporarily in positions such that they are not controlled by the selector which is then left free to be set by rotation, and means for rotating the cam member as set forth.

25. In a variable speed gear of the epicyclic type in which the speed variations are effected by the action of clutches and brakes on different gear members, the combination of a plurality of clutch and brake actuating members each comprising a rock shaft with a lever thereon, springs tending to move these members into their operative positions so as to effect engagement of the clutches and application of the brakes, a rotatable selector member about which the levers of the clutch and brake actuating members are disposed so that these levers can be acted on and the clutch and brake actuating members controlled by the selector member which is formed as a disk with recesses in its periphery the depth and relative positions of these recesses being such that according to the position in which the selector is set by rotation the recesses will determine the operative movements which may be permitted by the selector to the levers of the selected clutch and brake actuating members in the combinations necessary to effect the speed variations, means for rotating the selector member, a rotatable cam member mounted concentric with but separate from the selector member the cam member being so formed that rotation thereof in one direction will cause it to act simultaneously on each of the levers of the clutch and brake actuating members and move these members into and retain them temporarily in positions such that they are not controlled by the selector which is then left free to be set by rotation, and means for rotating the cam member as set forth.

26. In a variable speed gear of the epicyclic type in which the speed variations are effected by the action of clutches and brakes on different gear members, the combination of a plurality of clutch and brake actuating members each comprising a rock shaft with a lever thereon, springs tending to move these members into their operative positions so as to effect engagement of the clutches and application of the brakes, a disk like rotatable selector member about which the levers of the clutch and brake actuating members are disposed so that these levers can be acted on and controlled by the selector member the periphery of which is shaped to alternatively permit or prevent operative movement of each of the levers of the clutch and brake actuating members according to the position in which the selector member is set by rotation, means for rotating the selector member, a rotatable cam member mounted concentric with but separate from the selector member the cam member being so formed that rotation thereof will cause it to act on each of the levers of the clutch and brake actuating members and move these members into and retain them temporarily in positions such that they are not controlled by the selector which is then left free to be set by rotation, and an electric motor by means of which the cam member can be rotated into its operative position whence it will automatically return into its inoperative position by rotation in the reverse direction when the current is cut off from the motor as set forth.

27. In a variable speed gear of the epicyclic type in which the speed variations are effected by the action of clutches and brakes on different gear members, the combination of a plurality of clutch and brake actuating members each comprising a rock shaft with a lever thereon, springs tending to move these members into their operative positions so as to effect engagement of the clutches and application of the brakes, a rotatable selector member about which the levers of the clutch and brake actuating members are disposed so that these levers can be acted on and the clutch and brake actuating members controlled by the selector member which is formed as a disk with recesses in its periphery the depth and relative positions of these recesses being such that according to the position in which the selector is set by rotation the recesses will determine the operative movements which may be permitted by the selector to the levers of the selected clutch and brake actuating members in the combinations necessary to effect the speed variations, means for rotating the selector member, a rotatable cam member mounted concentric with but separate from the selector member the cam member being so formed that rotation thereof in one direction will cause it to act simultaneously on each of the levers of the clutch and brake actuating members and move these members into and retain them temporarily in positions such that they are not controlled by the selector which is then left free to be set by rotation, and an electric motor by means of which the cam member can be rotated into its operative position whence it will automatically return into its inoperative position by rotation in the reverse direction when the current is cut off from the motor as set forth.

28. In a variable speed gear of the epicyclic type in which the speed variations are effected by the action of clutches and brakes on different gear members, the combination of a plurality of clutch and brake actuating members, springs tending to move these members into their operative positions so as to effect engagement of the clutches and application of the brakes, a rotatable selector member formed as a disk with recesses in its periphery the depth and relative positions of these recesses being such that according to the position in which the selector is set by rotation the recesses will determine the operative movements that may be permitted by the selector to the selected clutch and brake actuating members in the combinations necessary to effect the speed variations, means for rotating the selector member, a rotatable cam mounted at the side of the selector member and concentric therewith but separate therefrom the cam member being so formed that rotation thereof will cause it to act on all the clutch and brake actuating members, means for rotating the cam member, and a plurality of controlling levers each forming a part of a clutch or brake actuating member all the levers being so disposed about the selector and the cam that movement of each lever can be controlled by the selector to an extent determined by the depth and position of the recesses therein and each lever can be acted on by the cam so as to free the selector in order that it may be set by rotation as set forth.

29. In a variable speed gear of the epicyclic type in which the speed variations are effected by the action of clutches and brakes on different gear members, the combination of a plurality of clutch and brake actuating members, a rotatable selector member formed as a disk with recesses in its periphery the depth and relative positions of these recesses being such that according to the position in which the selector is set by rotation the recesses will determine the operative movements which may be permitted by the selector to the selected clutch and brake actuating members in the combinations necessary to effect the speed variations, means for rotating the selector member, a rotatable cam mounted at the side of the selector member and concentric therewith but separate therefrom the cam being so formed that rotation thereof in one direction will cause it to act simultaneously on each of the clutch and brake actuating members and move them all into and retain them temporarily in positions such that they are not controlled by the selector, means for rotating the cam, and a plurality of controlling levers each forming a part of a clutch or brake actuating member all the levers being so disposed about the selector and the cam that movement of each lever can be controlled by the selector to an extent determined by the depth and position of the recesses therein and all the levers can be simultaneously acted on by the cam so as to free the selector in order that it may be set by rotation as set forth.

30. In a variable speed gear of the epicyclic type in which the speed variations are effected by the action of clutches and brakes on different gear members, the combination of a plurality of clutch and brake actuating members, springs tending to move these members into their operative positions so as to effect engagement of the clutches and application of the brakes, a rotatable selector member formed as a disk with recesses in its periphery the depth and relative positions of these recesses being such that according to the position in which the selector is set by rotation the recesses will determine the operative movement which may be permitted by the selector to the selected clutch and brake actuating members in the combinations necessary to effect the speed variations, means for rotating the selector member, a rotatable cam mounted at the side of the selector member and connected therewith but separate therefrom the cam being so formed that rotation thereof in one direction will cause it to act simultaneously on all the clutch and brake actuating members and move these members into and retain them temporarily in positions such that they are not controlled by the selector, a plurality of controlling levers each forming a part of a clutch or brake actuating member all the levers being so disposed about the selector and the cam that movement of each lever can be controlled by the selector to an extent determined by the depth and position of the recesses therein and all the levers can be simultaneously acted on by the cam so as to free the selector in order that it may be set by rotation, and an electric motor by means of which the cam can be rotated into its operative position whence it will automatically return into its inoperative position by rotation in the reverse direction when the current is cut off from the motor as set forth.

In testimony whereof I have signed my name to this specification in the presence of two subscribing witnesses.

ARTHUR JOHN ROWLEDGE.

Witnesses:
FREDERICK ALBERT DAVIES,
FREDK. JOHN PERRY.

Copies of this patent may be obtained for five cents each, by addressing the "Commissioner of Patents, Washington, D. C."